US012525708B2

(12) United States Patent
Stoleru

(10) Patent No.: US 12,525,708 B2
(45) Date of Patent: *Jan. 13, 2026

(54) TERMINAL ANTENNA ARCHITECTURE

(71) Applicant: Gilat Satellite Networks Ltd., Petah Tikva (IL)

(72) Inventor: Ronen Stoleru, Tel-Aviv (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,100

(22) Filed: Apr. 20, 2023

(65) Prior Publication Data

US 2024/0039146 A1 Feb. 1, 2024

Related U.S. Application Data

(63) Continuation of application No. 17/473,155, filed on Sep. 13, 2021, now Pat. No. 11,677,140.

(60) Provisional application No. 63/078,696, filed on Sep. 15, 2020.

(51) Int. Cl.

| | |
|---|---|
| ***H01Q 1/28*** | (2006.01) |
| ***H01Q 1/42*** | (2006.01) |
| ***H01Q 3/24*** | (2006.01) |
| ***H01Q 21/06*** | (2006.01) |
| ***H01Q 21/28*** | (2006.01) |
| ***H01Q 25/00*** | (2006.01) |

(52) U.S. Cl.

CPC ............... *H01Q 1/28* (2013.01); *H01Q 1/286* (2013.01); *H01Q 1/42* (2013.01); *H01Q 3/24* (2013.01); *H01Q 21/06* (2013.01); *H01Q 21/28* (2013.01); *H01Q 25/002* (2013.01)

(58) Field of Classification Search

None

See application file for complete search history.

(56) References Cited

U.S. PATENT DOCUMENTS

| | | | | |
|---|---|---|---|---|
| 3,086,204 A * | 4/1963 | Alford | H01Q 25/005 343/769 |
| 4,392,139 A * | 7/1983 | Aoyama | H01Q 25/002 343/705 |
| 5,444,762 A | 8/1995 | Frey et al. | |
| 5,552,798 A * | 9/1996 | Dietrich | H01Q 21/29 343/893 |
| 5,825,332 A * | 10/1998 | Camacho | H01Q 13/103 343/770 |

(Continued)

OTHER PUBLICATIONS

Feb. 8, 2022—European Search Report—EP 21196831.8.
Oct. 22, 2024—European Office Action—EP App. No. 21196831.8.

*Primary Examiner* — Ab Salam Alkassim, Jr.

(74) *Attorney, Agent, or Firm* — Banner & Witcoff, Ltd.

(57) ABSTRACT

Examples disclosed herein describe an antenna architecture (e.g., a planar electronically steered antenna architecture) that enables operation at low elevation angles, down to zero degrees from the satellite. The proposed '3SA' architecture may improve power consumption and array footprints. The proposed '3SA' architecture can support aero terminal implementation on aircraft, enabling the use of GEO, MEO and LEO satellites even in regions having low elevation angles. The architecture may include a horizontal antenna array and vertical antenna array as well as a controller for switching between the antenna arrays.

20 Claims, 7 Drawing Sheets

(56) References Cited

U.S. PATENT DOCUMENTS 6,052,078 A * 4/2000 Waterman .............. H01Q 19/28 343/705
6,097,343 A * 8/2000 Goetz .................. H01Q 13/085 343/708
6,175,336 B1 * 1/2001 Coughlin ................. H01Q 1/38 343/705
8,368,583 B1 * 2/2013 Piesinger .................. G01S 7/03 342/63
10,320,471 B1 6/2019 Panthi et al.
10,435,134 B2 * 10/2019 Braley ..................... H01Q 1/52
10,616,904 B1 * 4/2020 Mirkamali ............. H01Q 21/10
11,677,140 B2 * 6/2023 Stoleru .................... H01Q 3/24 343/705
2003/0117327 A1 * 6/2003 Navarro ................. H01Q 1/287 343/705
2005/0057431 A1 * 3/2005 Brown ............... H01Q 15/0013 343/909
2007/0152903 A1 * 7/2007 Lin .......................... H01Q 9/26 343/795
2007/0216586 A1 * 9/2007 Soiron ..................... H01Q 3/46 343/705
2008/0102812 A1 * 5/2008 Chari ....................... H04B 7/10 455/424
2008/0278388 A1 * 11/2008 McKivergan .......... H01Q 1/283 343/708
2010/0188304 A1 7/2010 Clymer et al.
2012/0142274 A1 * 6/2012 Bard ...................... H01Q 3/247 455/67.11
2012/0202430 A1 * 8/2012 Jalali ........................ H01Q 1/28 342/368
2014/0327577 A1 * 11/2014 Ozaki .................... H01Q 25/00 343/705
2015/0011159 A1 1/2015 Marinov et al.
2015/0215029 A1 7/2015 Lemme
2016/0028451 A1 * 1/2016 Hu ......................... H01Q 1/246 370/329
2016/0084623 A1 3/2016 Facciano et al.
2016/0294043 A1 * 10/2016 Pascual Gil ........... H01Q 1/287
2017/0070246 A1 * 3/2017 Natesan ............... H04B 1/0458
2017/0356980 A1 * 12/2017 Islam ....................... H01Q 3/24
2017/0358851 A1 * 12/2017 Diamond ................. H01Q 3/08
2018/0166779 A1 * 6/2018 Feria ........................ H01Q 1/24
2019/0363453 A1 * 11/2019 Yu ........................ H04B 7/0413
2020/0203808 A1 * 6/2020 Su ........................ H01Q 9/0421
2020/0252881 A1 8/2020 Noel et al.
2020/0259250 A1 * 8/2020 Diamond ................. H01Q 1/42
2021/0234270 A1 7/2021 Stoleru et al.
2021/0249767 A1 8/2021 Greenwood et al.
2021/0305715 A1 * 9/2021 Obeidat ................. H01Q 1/007
2022/0115777 A1 * 4/2022 Konitzer ................ H01Q 1/287

* cited by examiner

220

TERMINAL ANTENNA ARCHITECTURE

CROSS-REFERENCE TO RELATED APPLICATIONS

This application claims priority to and is a continuation of U.S. application Ser. No. 17/473,155, filed Sep. 13, 2021, entitled "Controllable Antenna Arrays for Wireless Communications" which is a non-provisional of and claims priority to U.S. Provisional Patent Application No. 63/078,696, filed Sep. 15, 2020, which is hereby incorporated by reference in its entirety.

TECHNICAL FIELD

Aspects of the disclosure pertain to antennas for wireless communications. Some aspects pertain to electronically steerable array (ESA) antennas for wireless communications.

BACKGROUND

Wireless communication systems, including systems for communication via satellites, are being used for a variety of civil and military applications, including aviation, maritime, and land-mobility. Antennas may be used for transmitting and receiving wireless signals between various remote devices. In some cases, the antennas being used may exhibit high power consumption and high beam scan loss especially at low elevation angles towards the satellite. A higher beam scan loss results in lower reception and transmission gain values, which may lead to increasing the antenna dimensions (i.e. footprint). Such increase in antenna footprint is often prohibitive for installation on certain platform types.

BRIEF SUMMARY

The following presents a simplified summary in order to provide a basic understanding of some aspects of the disclosure. This summary is not an extensive overview of the disclosure. It is neither intended to identify key or critical elements of the disclosure nor to delineate the scope of the disclosure. This summary merely presents some aspects of the disclosure in a simplified form as a prelude to the description below.

It has been found that planar phased array antennas may be susceptible to "scan loss", which may account for a drop in antenna directivity versus scanning angle (measured from the normal of the antenna plane (boresight direction) towards the beam direction). For example, for a beam scan angle of 45 degrees, the directivity of the antenna array with respect to the boresight direction may drop by more than 2 dB, while for a beam scan angle of 60 degrees the directivity with respect to the boresight direction may drop by more than 4 dB.

Looking at planar phased array antenna gain, which reflects the radiation intensity in the desired directions versus the radiation intensity of an isotropic antenna (all angles), the gain value of the antenna is based on two factors: the gain of a single element (for example a patch antenna) and the number of elements in the array (which may depend on the array's geometric dimensions where, for example, an element occupies a certain area). The gain of an antenna element depends also on the scan angle offset from boresight. For example, when operating at 0 degrees scan angle (90 degrees elevation angle) the effective antenna aperture is maximal and so is the antenna gain. Yet, when operating at 90 degrees scan angle (0 degrees elevation angle) the effective antenna aperture is zero, thus the antenna has no gain to support satellite link connectivity (which may hinder terminal operation).

In order to maintain a communication link between a satellite and a terminal above the signal-to-noise (SNR) ratio required for the satellite modem's demodulator to decode and process the received signal information, a minimal antenna receive gain referred to as G/T (gain over temperature figure of merit) may be necessary. This is especially challenging when operating at low elevation angle values, where scan loss contributes to lower G/T values. In a planar phased array antenna design process, this minimal elevation angle working point is typically the threshold parameter that drives the design consideration for the antenna receive and transmit arrays' dimensioning, thereby resulting in the physical antenna dimension and the derived power consumption value.

When implementing planar phased array antennas or Electronically Steered Antennas (ESAs) on an aircraft that travels at high latitude northern (or southern) air routes, such as in the case of commercial aviation transatlantic travel (for example between Europe and USA), the elevation angle towards some Geostationary Earth Orbit (GEO) or Medium Earth Orbit (MEO) satellites could be as low as 10 degrees or even less. The scan loss at these low elevation angles introduces a limitation, which practically prohibits the implementation of traditional ESA terminal architecture from being considered, as supporting the required SNR to close the link budget results in large receive and transmit array dimensioning, which drives high power consumption. Both the large footprint of the antenna installed on the aircraft fuselage and the resulting power consumption of the enlarged receive and transmit arrays make such implementation impossible or impractical on typical business aviation jets or turboprop aircrafts as well as commercial aviation narrow body and wide body aircrafts. These aircrafts are often limited in the amount of power that could be supported outside the aircraft equipment (OAE) as well as in the footprint on the fuselage which is available for planar phased array antennas that are mandatory for inflight connectivity (IFC) via satellite.

The proposed '3SA' (three-ESA) terminal architecture significantly reduces the above described problems introduced by low elevation angle operation (which is driving traditional terminal design outcome to large receive (Rx) and transmit (Tx) array antennas) both in terms of size (footprint) and in terms of the resulting power consumption. The 3SA terminal architecture is based on separation of the antenna into two orientations: a horizontal orientation for operation at high elevation angles and a vertical orientation for operation at low elevation angles. With the 3SA architecture, the scan loss is kept at relatively low values by switching between the antenna arrays according to various decision parameters, such as an elevation angle between the operational antenna and the satellite. Thus, implementation of the 3SA architecture may result in low gain loss. Consequently, the resulting antenna design may include much smaller arrays, consuming a fraction of the power compared to traditional antenna designs. An antenna controller may switch the antenna operation between one or more vertical Tx/Rx arrays and a horizontal Tx/Rx array, e.g., as function of various input parameters including the elevation angle (that may be calculated based on the aircraft platform (terminal) location and the satellite orbital location).

For example, when operating at high elevation angles, an antenna horizontally mounted on top of the aircraft fuselage may be in use. The scan angle towards the satellite may be kept under an x degrees threshold (e.g., 45 degrees) and the scan loss for typical radiating patch element antennas may be as low as 1.5 dB. When the elevation angle towards the satellite is lower than 90−x degrees (e.g., 45 degrees per the given example), the antenna controller may switch to the vertical antenna that may be installed inside the aircraft's tail or "dorsal fin" (depending on aircraft type and implementation). As the vertical antenna may be positioned 90 degrees (perpendicular) to the horizontal antenna, the scan angle towards the satellite may be reduced. While in some implementations the vertical antenna may be oriented such that its boresight direction is approximately 90 degrees apart from that of the horizontal antenna, other degrees of separation (e.g., greater than 45 degrees) may be used in other implementations. In some embodiments, a total of 3 ESA antennas may be operated in turns in accordance with the aircraft route direction and elevation angle. For example, one antenna may be installed on the aircraft fuselage (horizontal antenna) and two antennas may be installed back-to-back inside the aircraft's tail or "dorsal fin" (where applicable), for at least the purpose of allowing full coverage regardless of the aircraft position relative to the satellite location.

It may be noted that when operating a communication system using the vertical positioned antenna, a scan loss increase may be the result of the azimuth angle towards the satellite. Such satellite (and orbital position) selection should support minimal low scan angle range in the azimuth direction.

Switching (e.g., instantaneous switching) between the antennas assures continuous communication and operation with the satellite, as well as the ability to operate from 90 degrees elevation (using the horizontally oriented antenna on the fuselage) down to 0 degrees elevation (using one of two back-to-back antennas installed inside the aircraft's tail or "dorsal fin").

The antenna architectures and implementations described herein may solve the fundamental limitation of planar electronically steered antennas operating at low elevation angles and are especially applicable to aero antennas installed on aircraft traveling at northern (southern) routes while operating with GEO or MEO satellites. The terminal architecture may be similarly applicable to other vertical markets, such as maritime and land mobility, where a flat horizontal antenna design may result in large dimension and high-power consumption, while operating at low elevation angles towards the satellite.

It may be noted that the same advantage applies when operating with low earth orbit (LEO) satellite constellations, where satellite selection may be done based on criteria of minimal elevation angle towards the vertical or the horizontal antenna arrays, reducing scan loss and maximizing transmit and receive gain values, which corresponds to higher satellite bandwidth utilization and/or user throughput in terms of data rates.

BRIEF DESCRIPTION OF THE DRAWINGS

Figure 1:
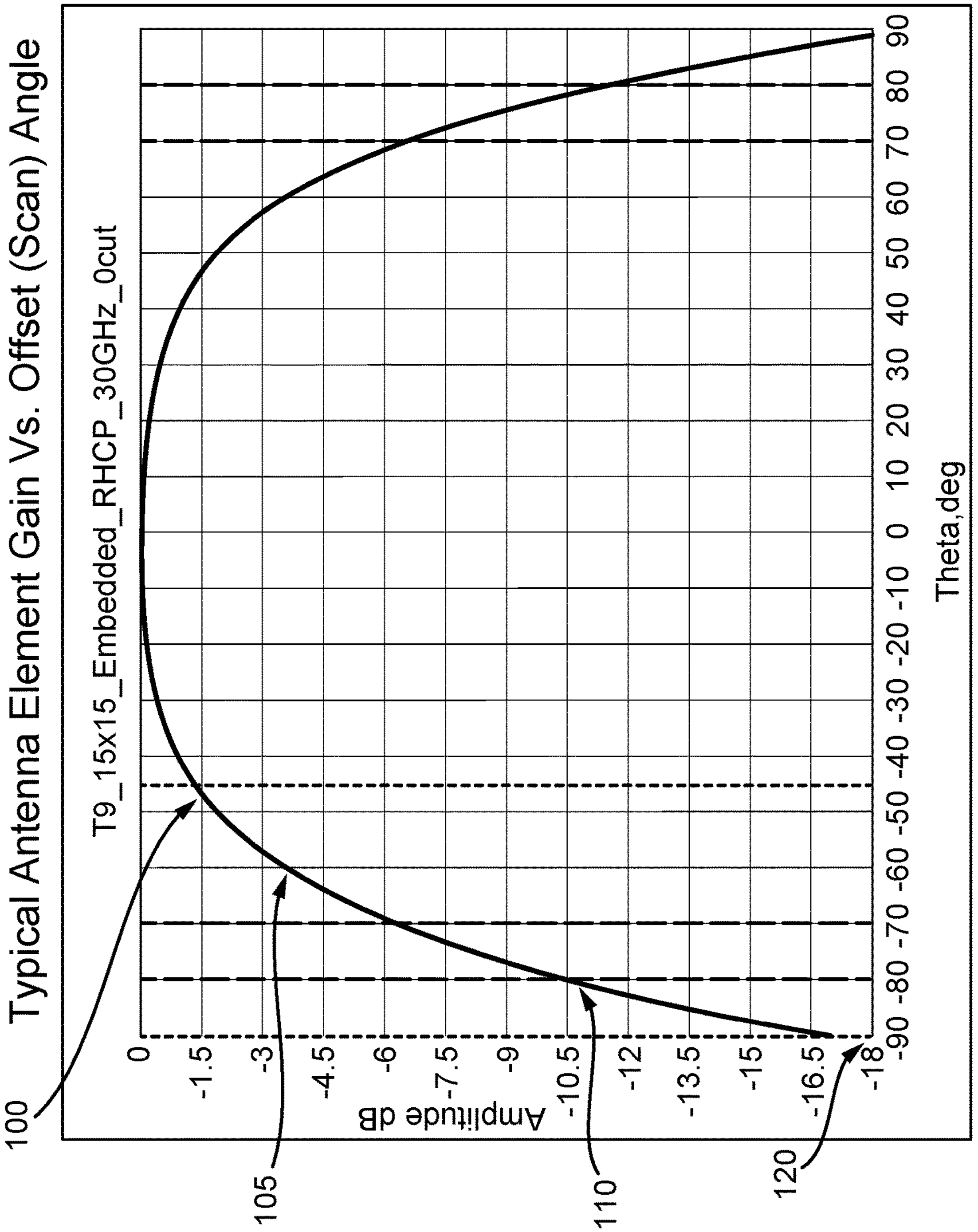

Having thus described the disclosure in general terms, reference will now be made to the accompanying drawings, which are not necessarily drawn to scale, and wherein:

FIG. 1 shows an example of typical antenna element gain versus offset (scan) angle, in accordance with aspects of the disclosure.

Figure 2:
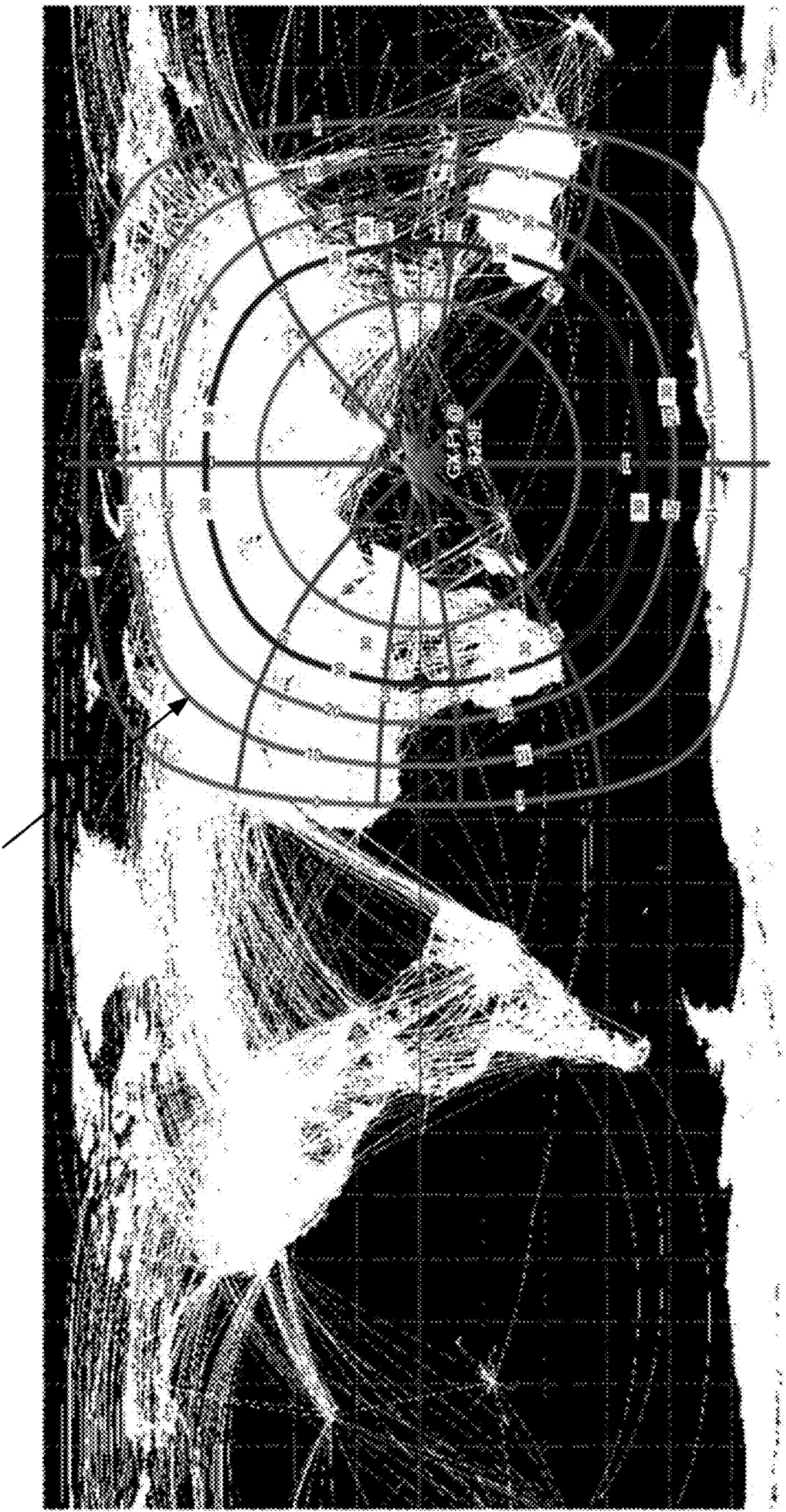

FIG. 2 shows global commercial aviation routes placed on a world map, with indications of the resulting elevation angles from a terminal to a GEO satellite, in accordance with aspects of the disclosure.

Figure 3:
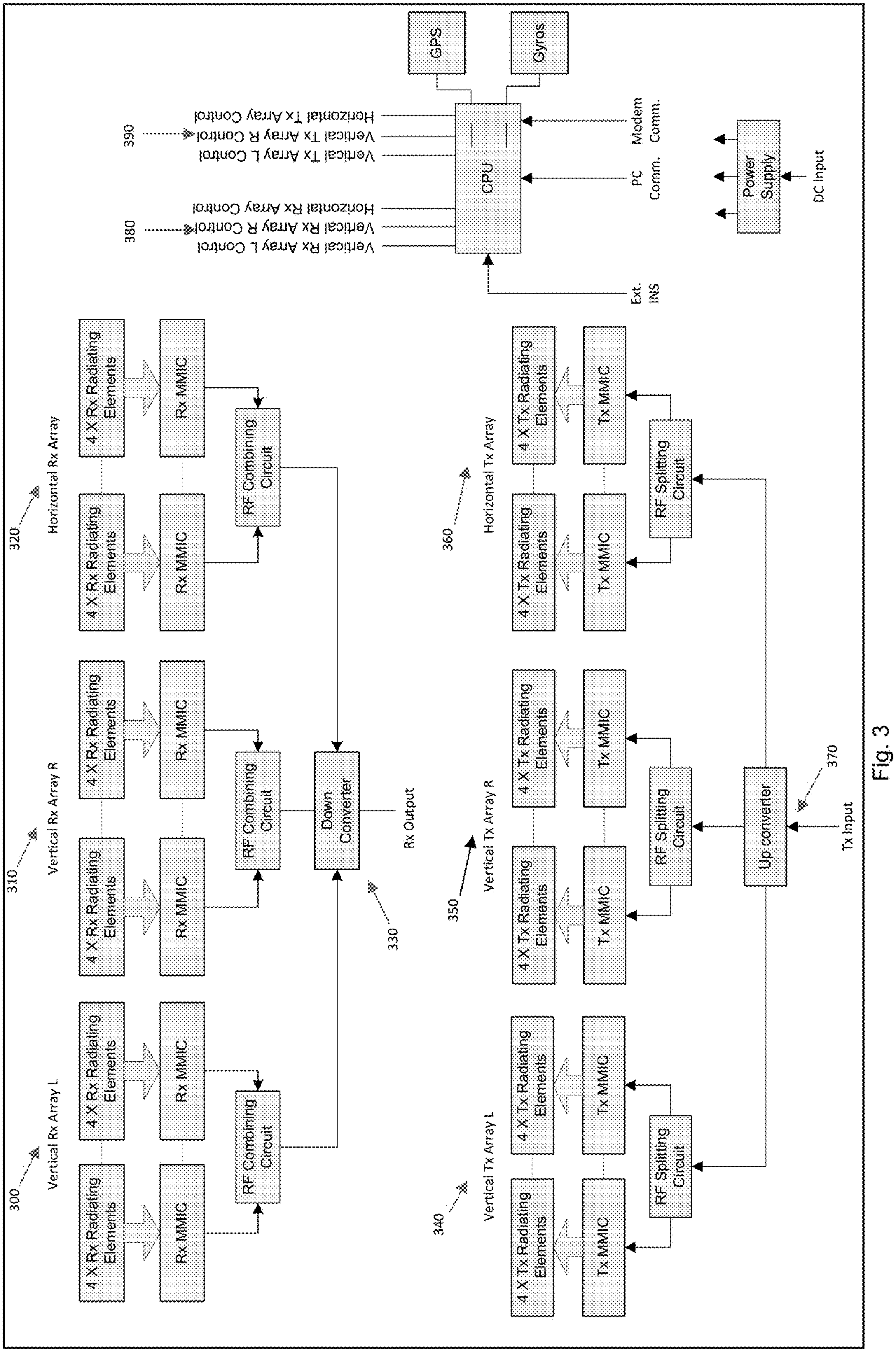

FIG. 3 shows an example of a '3SA' terminal architecture, in accordance with aspects of the disclosure.

Figure 4:
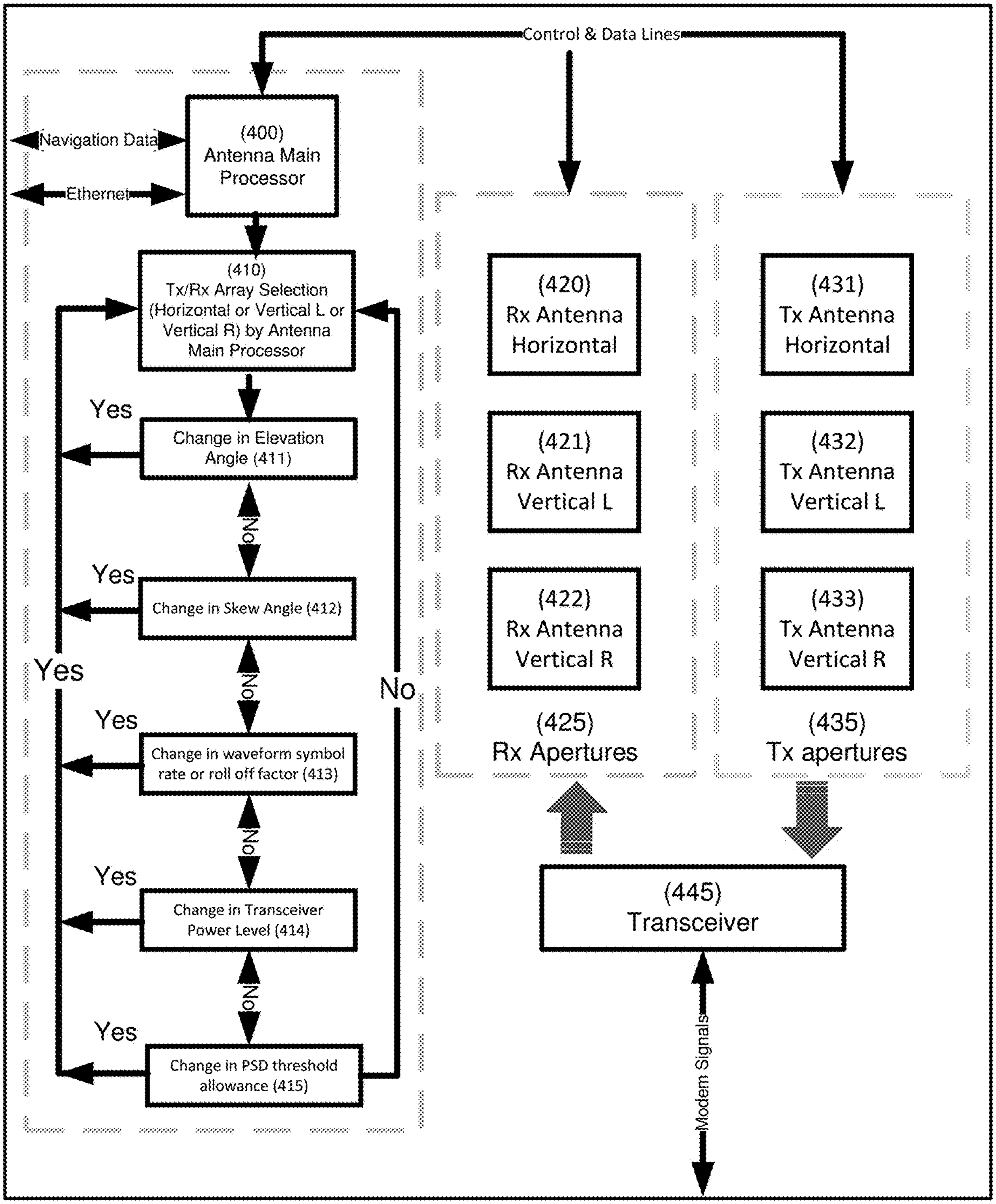

FIG. 4 shows an example of a '3SA' antenna selection algorithm, in accordance with aspects of the disclosure.

Figure 5:
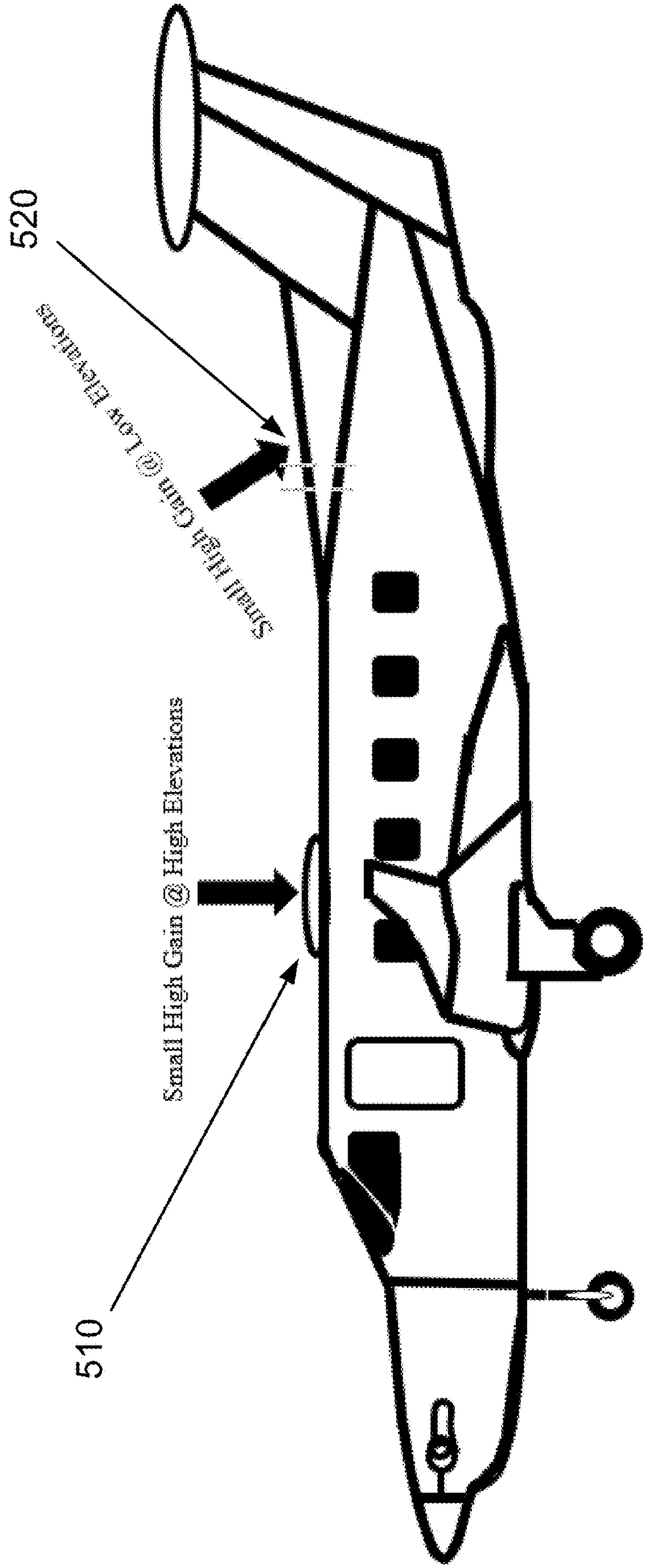

FIG. 5 shows an example of a '3SA' terminal mounting on an aircraft, in accordance with aspects of the disclosure.

Figure 6:
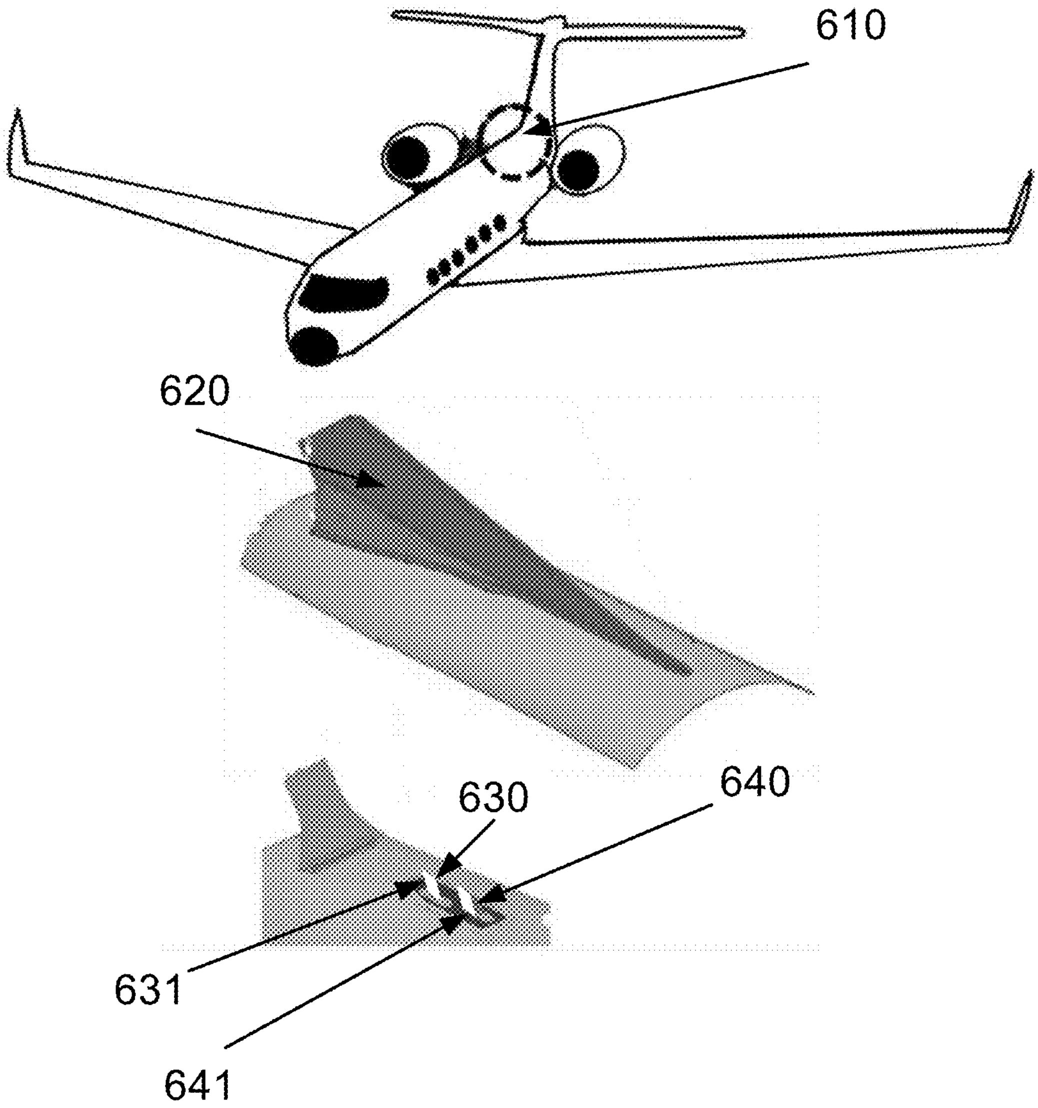

FIG. 6 show an example implementation of a vertical antenna array installation on an aircraft (e.g., a Gulfstream G650 aircraft), in accordance with aspects of the disclosure.

Figure 7:
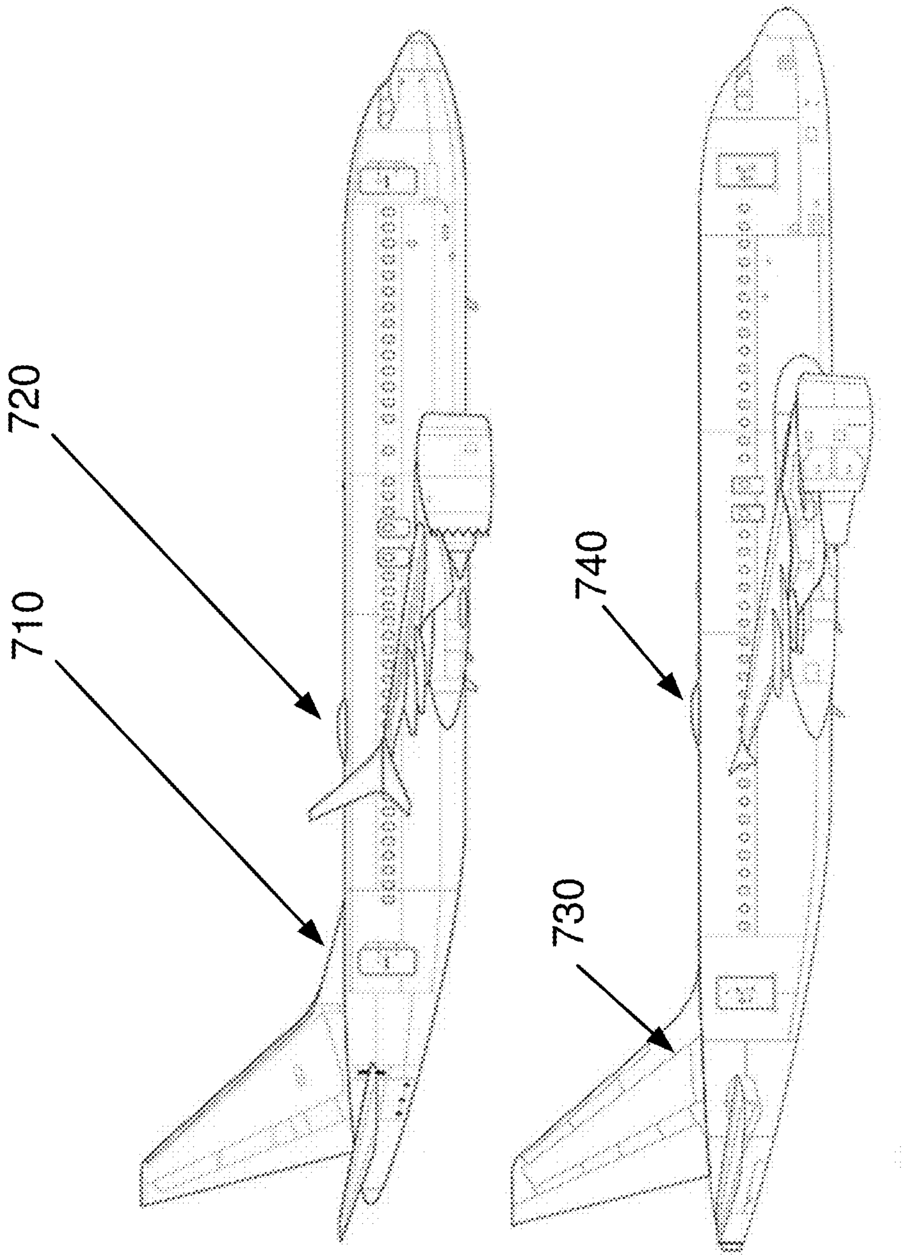

FIG. 7 shows example implementations of a '3SA' terminal on aircraft (e.g., a Boeing 737 "Dorsal fin" or an Airbus 320 tail), in accordance with aspects of the disclosure.

DETAILED DESCRIPTION

Wireless communications utilize antennas to transmit and receive signals between different devices. For example, a satellite communication system for commercial and/or non-commercial applications (e.g., aviation) may comprise antennas mounted on a remote station such as a fixed or mobile device (e.g., an aircraft), a satellite, and/or a ground earth station (GES) (e.g., a Hub station). The antennas may provide for reception and transmission of the electromagnetic signals communicated between, for example, the remote station(s) and/or other remote station(s) and/or Hub station(s). A variety of remote antenna types may be used including, but not limited to: steered flat panel antennas (e.g., mechanically steerable passive arrays and/or electronically steerable active arrays), reflectors and/or reflector arrays, hybrid steering antennas (combining mechanical steering with electronic steering), and electronic steerable antennas such as phased array antennas (PAA) which may include electronic beam steering capabilities.

In some examples, mobile antennas may be arranged to be mounted on moving platforms such as aircraft (e.g., aero antennas) and may be variously configured. In some examples, these antennas may have a low profile to reduce air drag and fuel consumption. These antennas may optimize transmit and receive performance per a given footprint (e.g., given dimensions). These antennas may be disposed at a location such as on the top of a vehicle, train, boat, high altitude platforms (HAPS) satellite, and/or aircraft's fuselage. These antennas may be optimized to reduce operation and maintenance costs. These antennas may be configured to have low power consumption. These antennas may be configured to dissipate power when the vehicle is not moving (without air circulation around the antenna array). These antennas may support wide frequency bands, wide angle scanning performance, multi-beam operation, and fast beam steering.

In some examples, the antenna may be used as a part of the ground-based antenna system that is a part of a satellite communication system (e.g., mobile devices with satellite communication features). The satellites of the satellite communication system may be in one or more constellations in one or more different orbits such as low Earth orbit (LEO), medium Earth Orbit (MEO), or geostationary earth orbit (GEO). For example, a LEO satellite constellation (e.g., a mega-constellation) may be composed of a plurality of (e.g., thousands) of satellites, based on architectures such as CubeSat architecture. The satellite constellation may be in communication with a number of ground stations. The space segment of the constellation may be organized in several orbital planes that may be deployed at different inclinations and altitudes. The satellites may move at high speeds (e.g., higher than 25,000 km/h) relative to the ground stations. Therefore, a communication link between a ground station and a satellite may be available for a short time (e.g., a few minutes) before handover to another satellite occurs.

In another example, the antenna may be used as a payload for HAPS, LEO, and/or MEO satellites and may provide a relatively more power efficient beam scanning antenna solution with a relatively lower profile.

A phased array antenna may be utilized as a mobile antenna. A phased array antenna may comprise multiple electronically-controlled antenna elements (e.g., fixed and/or variable beam antenna elements), which in combination may control the antenna's radiation and/or reception patterns. The phased array antenna's radiated beam and/or received beam may be electronically steered relative to a plane of the antenna array. Phase shifters and/or time-delay components may be connected to individual transmitting and/or receiving antenna elements (e.g., sub-arrays composed of antenna elements) to enable pointing of the beam in different directions. Individually controlling the amplitude and phase of each antenna element in a phased array antenna, in conjunction with beamforming techniques, may allow suppression of side lobes and may further allow creating radiation pattern nulls in certain directions and/or application specific patterns.

Control circuitry may be variously configured to include such items as compact silicon technology based integrated circuits, one or more processors, controllers, programmable gate arrays (PGA), application-specific integrated circuits (ASICs), and/or custom controllers. The control circuitry may also include transmitters, receivers, modems, encoders, decoders, phase shifter(s) to adjust phase, beam steering circuits, polarization circuits, attenuators, filters, amplifiers (e.g., low noise amplifier(s)), and beam forming and polarization circuits, as well as other control and/or communication circuits for implementing transmit-only, receive-only, and/or transmit/receive components of a mobile communication system such as a mobile satellite terminal system. Technologies like SiGe BiCMOS and CMOS SOI (silicon-on-insulator) may allow combination of digital circuitry to control the steering in the array and a radio frequency (RF) signal path to achieve the phase and amplitude adjustment.

Phased array antennas may comprise a single array for transmit-only, a single array for receive-only and/or as single array for transmit/receive. In addition, phased array antennas may comprise of a combination of array building blocks, often referred to as tiles, which may be combined in a group to form a larger array aperture.

The gain of the antenna (also often referred to as power gain) is a key performance metric which combines the antenna's directivity and electrical efficiency. Looking at planar phased array antenna gain which reflects the radiation intensity in the desired directions versus the radiation intensity of an isotropic antenna (all angles), the gain value of the antenna is based on two factors: the gain of a single element (for example a patch antenna) and the number of elements in the array (which may depend on the array's geometric dimensions where, for example, an element occupies a certain area). The gain of an antenna element depends also on the scan angle offset from boresight. The total gain of the antenna (e.g., corresponding to the gain of the patch elements) may be affected also by the scan loss. For example, in a transmitting antenna, the antenna gain indicates how well the antenna may be converting the input power into radio waves which may be transmitted in a specific direction. For planar phased array antennas comprising multiple patch antenna elements, the total gain of the antenna may correspond to the summation of the gain for each antenna element (e.g., each patch antenna). Therefore, to increase the antenna gain, one may increase the number of patch elements thus increasing the size of the antenna aperture and in most cases, the power consumption of the array in accordance.

It has been found that the planar phased array antennas may be susceptible to "scan loss", which may account for a drop in antenna directivity versus scanning angle measured from the normal of the antenna plane (often referred to as boresight direction) towards the beam direction.

The graph shown in FIG. 1 illustrates gain loss for a typical patch antenna element. The graph shows gain loss (Y-axis) for various angles offset from the boresight direction (X-axis). Maximum gain may be achieved when the offset angle (scan angle) is 0 degrees. When the scan angle is increased, a degradation in the patch antenna element gain may be presented. For example, at a scan angle of 45 (or −45) degrees, the element gain (100) may be about 1.5 dB lower than the maximal gain that may be achieved at boresight. In another example, at a scan angle of 60 (or −60) degrees, the element gain (105) may be about 4 dB lower than the maximal gain. Yet in another example, at a scan angle of 80 (or −80) degrees, the element gain (110) may be about 10.5 dB lower than the maximal gain. And, for scan angles of 90 (or −90) degrees, the element gain (120) may by degraded by over 18 dB compared to boresight gain. This gain degradation behavior may directly affect the gain efficiency of the antenna when operating at low elevation angles towards the satellite. In such cases, the scan loss may be significantly increased (because antenna elevation angle equals 90 degrees minus the antenna's scan angle). FIG. 2 demonstrates the elevation angles (220), including the low elevation angles like the 20 degree and 10 degree elevation angles, encountered when implementing planar phased array antennas or Electronically Steered Antennas (ESA) on aircrafts traveling at high latitude northern (or southern) routes.

Examples disclosed herein describe an antenna architecture referred to as '3SA' (three-ESA). The 3SA antenna architecture may significantly reduce the impact of operating at low elevation angles (high scan angles). The 3SA antenna architecture may be suitable for supporting communication over any of GEO satellites, MEO satellites and satellite constellations, or LEO satellite and satellite constellations.

The 3SA terminal architecture may be based on separation of the antenna terminal into two orientations: a horizontal orientation (e.g., for operation at high elevation angles), and a vertical orientation (e.g., for operation at low elevation angles). With the 3SA architecture, a relatively low scan loss may be obtained, resulting in relatively low gain loss.

A 3SA architecture may comprise one or more horizontal antenna arrays, one or more vertical antenna arrays, and an antenna controller. For example, one 3SA system may include one horizontal antenna array and two vertical antenna arrays as well as an antenna controller for controlling the three arrays. Each of the antenna arrays may be configured to receive and/or transmit electromagnetic waves. The antenna controller may be configured to determine a scan loss value, and when the scan loss value increases beyond a threshold (e.g., pre-set or pre-programmed threshold), to select a (different) operating antenna array from the two vertical Tx/Rx arrays and the horizontal Tx/Rx array. The antenna controller may be configured to select the operating antenna array independently of any modem or other equipment that may be coupled to the antenna. The controller may be configured to perform said selecting in accordance with an elevation angle calculation. In some embodiments, calculating the elevation angle may be based on an aircraft platform (terminal) location and on the satellite orbital location.

In some embodiments, the two vertical antenna arrays may be installed inside or on a tail (or in a “dorsal fin”) of an aircraft. For example, the two vertical antenna arrays may be installed in a back-to-back arrangement (e.g., on opposite sides of the tail such that the boresight directions are approximately opposite of each other or more than 120 degrees apart), for at least the purpose of avoiding a line of sight blocking by the tail, as illustrated in FIG. 2 (showing that the side of the (tail of the) aircraft facing a satellite depends on whether the aircraft is flying eastwards or westwards). With the two vertical antenna arrays installed while facing back-to-back, a line of sight towards a satellite can be maintained whenever the terminal needs to use the vertical antenna arrays and regardless of the orientation of the aircraft towards the satellite (i.e. whether its left side or its right side faces the satellite). In some embodiments, the horizontal antenna array and the two vertical antenna arrays may be packed in a single enclosure (e.g., casing or housing).

FIG. 3 shows a block diagram of a 3SA system. The 3SA system may comprise three receiver (Rx) arrays: a vertical left Rx array (300), a vertical right Rx Array (310) and a horizontal Rx Array (320). Similarly, the 3SA system may comprise three transmission (Tx) arrays: a vertical left Tx array (340), a vertical right Tx array (350), and a horizontal Tx array (360). The three Rx arrays may be coupled to an antenna RF down converter (330), and similarly the three Tx arrays may be coupled to an antenna RF up converter (370). The 3SA system may comprise an antenna controller, which may further comprise any of a central processing unit (CPU) (e.g., processor, microprocessor, microcontroller, etc.), a GPS receiver or one or more gyros. The CPU of the antenna controller may be configured to use control signals 380 for selecting an operating Rx array, and to use control signals 390 for selecting an operating Tx array. In some embodiments, only a selected array (of the 3 Rx arrays and/or the 3 Tx arrays) may be powered on, while the remaining (unselected) arrays may be kept powered off (e.g. until being selected) or in a low power consumption or standby mode, for at least the purpose of reducing the overall power consumption of the 3SA system.

In some embodiments, the vertical left Rx array (300) and the vertical left Tx array (340) may be coupled to construct one of two vertical antenna arrays, while the vertical right Rx array (310) and the vertical right Tx array (350) may be coupled to construct the other of the two vertical antenna arrays. In addition, the horizontal Rx array (320) and the horizontal Tx array (360) may be coupled to construct the horizontal antenna array.

FIG. 4 shows a diagram describing an algorithm for Tx and Rx array selection. In some embodiments, the antenna controller (e.g., a processor (400) of the antenna controller) may be configured (e.g., programmed or hardwired) to perform such algorithm. The algorithm may include a routine (410) for selecting operating arrays from among the available arrays (e.g., Rx apertures (425) and Tx apertures (435)), such as the horizontal Rx array (420), horizontal Tx array (431), vertical left Rx array (421), vertical left Tx array (432), vertical right Rx array (422), and vertical right Tx array (433). In some embodiments, selecting the operating arrays may comprise selecting a pair of corresponding Tx and Rx arrays, for example, selecting the vertical left Rx array (421) and the vertical left Tx array (432), As shown in the flow chart, several factors may influence the selecting, or trigger a change in the selecting, of an operating array, including an elevation angle of the currently operating array towards a currently used satellite (411), a skew angle of the antenna beam (412), one or more waveform/throughput considerations (413), change in transceiver power level (414), and Power Spectral Density (PSD) regulation considerations (415). For example, when operating at high elevation angles, an antenna horizontally mounted on top of an aircraft fuselage may be selected for use in transmitting or receiving. As a result of this selection, the scan angle towards the satellite may be kept under an x degrees threshold (e.g. 45 degrees) and the scan loss may be as low as 1.5 dB. This x degrees threshold may be stored in memory within the antenna controller. It also may be set before or during a flight. When the elevation angle towards the satellite is lower than 90−x degrees (e.g., 45 degrees per the given example), the antenna controller may determine to switch to a vertical antenna, which may be installed inside or on the aircraft tail or “dorsal fin”. When the antenna controller 400 determines to switch to a different array during a communication session, it may signal a modem (e.g., through an Ethernet connection) to stop transmitting prior to the switchover, and then resume transmission after the switchover, so no data will be lost.

FIG. 4 also illustrates control and data lines from the controller (e.g., processor (400) to the various antenna arrays. These lines may carry control information for controlling the operation of the arrays (e.g., information for steering the arrays). These lines may also include feedback information indicating information about the arrays (e.g., their transmission or reception power, boresight direction, etc.). Further, FIG. 4 illustrates that the architecture may include a transceiver (445) for receiving and transmitting modem signals.

FIG. 5 illustrates a possible installation scheme on a small turboprop aircraft where the horizontal Tx and Rx arrays to be used at high elevation angles may be installed on or in the fuselage (510), and the two vertical Tx and Rx arrays to be used at low elevation angles may be installed on or in a fin (520) that may be connected to the tail of the aircraft. A small aircraft with relatively small fuselage diameter puts mechanical and aerodynamic constraints on size (footprint area) of the satellite antenna that may be installed on or in the fuselage. In many cases, assuming a horizontal-plane only antenna, the link budget constrains may derive antenna footprint diameter to exceed the available installation area on the aircraft fuselage, thus prohibiting the use of satellite communication on these types of aircraft. A 3SA antenna architecture may significantly reduce the size of the needed antenna area, making the horizontal antenna small enough to be installed on or in the fuselage (510) in addition to the vertical array on or in the fin (520).

FIG. 6 illustrates a possible installation scheme on a medium size business jet. The horizontal Tx and Rx arrays may be installed (or mounted) on the fuselage. In addition, the 4 vertical antenna arrays, e.g., left and right Tx arrays (630 and 631) and left and right Rx arrays (640 and 641), may be installed on or in a fin (620) that connects to the tail of the aircraft at a section (610) of the aircraft.

FIG. 7 illustrates a possible installation scheme for installing (or mounting) a 3SA antenna architecture on a large aircraft, such as those in use for commercial aviation. For example, FIG. 7 shows that a vertical array may be installed (or mounted) on or in the tail (730) or a fin (710) of an aircraft. It also shows that a horizontal array may be installed (or mounted) on the fuselage (720 or 740) of the aircraft. As in the case of a small aircraft where the 3SA antenna architecture may decrease the size of a horizontal array installed on the fuselage (thus making the installation feasible or practical), the 3SA antenna architecture may provide a similar benefit in reducing the area occupied by the horizontal array on a large aircraft. The 3SA system may also have the benefit of utilizing the maximum allowable antenna dimension (gain) for reaching higher performance while operating at low antenna scan (and gain) loss. The 3SA antenna architecture allows operating at high gain for a given geometry and elevation angle case, before switching to the opposite orientation. For commercial aviation, increasing data throughput available to airline passengers may be desirable.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

The invention claimed is:

1. A method comprising:

selecting, by a controller installed in or on an aircraft, an operating antenna array based on an elevation angle between a location of the aircraft and an orbital location of a satellite, wherein the selected operating antenna array is a horizontal antenna array installed in or on a fuselage of the aircraft or one of two vertical antenna arrays installed back-to-back in or on a tail or fin of the aircraft, wherein each of the two vertical antenna arrays comprises a receiving array and a transmitting array; and communicating with the satellite using the selected operating antenna array.

2. The method of claim 1, further comprising:

causing the horizontal antenna array and the two vertical antenna arrays to operate at scan angles within a range determined based on a threshold indicating a maximum acceptable scan loss.

3. The method of claim 1, wherein the satellite is one of a GEO satellite, MEO satellite, or LEO satellite.

4. The method of claim 1, further comprising:

switching from an unselected antenna array to the operating antenna array; and reducing power associated with the unselected antenna array.

5. The method of claim 1, wherein the selecting the operating antenna array comprises selecting the horizontal antenna array based on a determination that the elevation angle is greater than a threshold.

6. The method of claim 1, wherein the selecting the operating antenna array comprises selecting one of the two vertical antenna arrays based on a determination that the elevation angle is less than a threshold.

7. The method of claim 1, wherein the operating antenna array comprises one of a mechanically steerable passive array of antennas or electronically steerable active array of antennas.

8. The method of claim 1, further comprising:

causing a modem to stop transmitting prior to switching to the selected operating antenna array.

9. A method comprising:

determining, by a controller installed in or on an aircraft, an elevation angle between a location of the aircraft and an orbital location of a satellite;

based on the elevation angle, selecting an operating antenna array from one of a horizontal passive array of antennas installed in or on a fuselage of the aircraft and one of two vertical passive arrays of antennas installed back-to-back in or on a tail or fin of the aircraft, wherein each of the two vertical antenna arrays comprises a receiving array and a transmitting array; and communicating with the satellite using the selected operating antenna array.

10. The method of claim 9, wherein the operating antenna array comprises a mechanically steerable passive array of antennas.

11. The method of claim 9, further comprising:

switching from an unselected antenna array to the operating antenna array; and reducing power associated with the unselected antenna array.

12. The method of claim 9, wherein the selecting the operating antenna array comprises selecting the horizontal passive array of antennas based on a determination that the elevation angle is greater than a threshold.

13. The method of claim 9, wherein the selecting the operating antenna array comprises selecting the one of the two vertical passive arrays of antennas based on a determination that the elevation angle is less than a threshold.

14. The method of claim 9, further comprising:

causing a modem to stop transmitting prior to switching to the selected operating antenna array.

15. A system comprising:

a horizontal antenna array installed in or on a fuselage of an aircraft;

two vertical antenna arrays installed back-to-back in or on a tail or fin of the aircraft, wherein each of the two vertical antenna arrays comprises a receiving array and a transmitting array; and a controller installed in or on the aircraft, the controller configured to:

determine an elevation angle between a location of the aircraft and an orbital location of a satellite;

select an operating antenna array from the horizontal antenna array or one of the two vertical antenna arrays; and communicate with the satellite using the selected operating antenna array.

16. The system of claim 15, wherein the controller is configured to select the horizontal antenna array as the operating antenna array based on a determination that the elevation angle is greater than a threshold.

17. The system of claim 15, wherein the controller is configured to select one of the two vertical antenna arrays as the operating antenna array based on a determination that the elevation angle is less than a threshold.

18. The system of claim 15, wherein a boresight direction of the horizontal antenna array is approximately perpendicular to a boresight direction of one of the two vertical antenna arrays.

19. The system of claim 15, further comprising the aircraft, wherein the operating antenna array comprises one of a mechanically steerable passive array of antennas or electronically steerable active array of antennas.

20. The system of claim 15, wherein the controller is further configured to cause a modem to stop transmitting prior to switching to the selected operating antenna array.

* * * * *